Nov. 17, 1931.    N. LEINAU    1,832,713
PIPE THREAD PACKING SLEEVE
Filed June 11, 1930
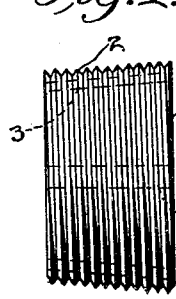
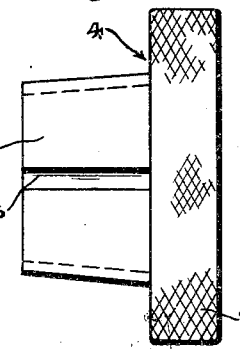
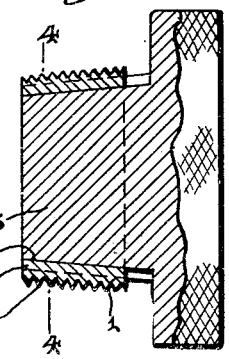
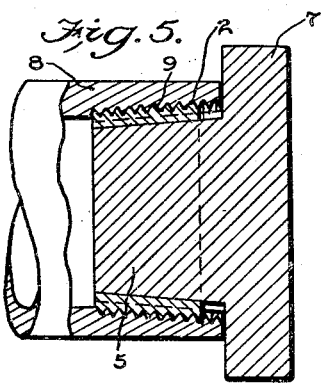
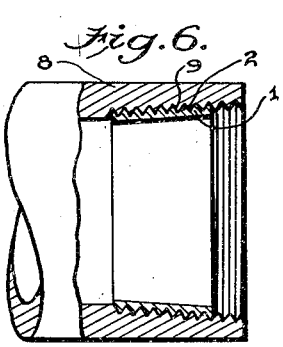
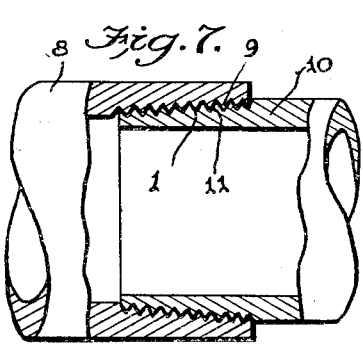
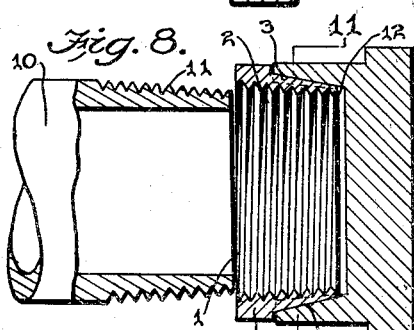
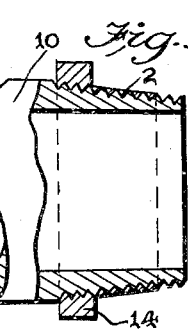
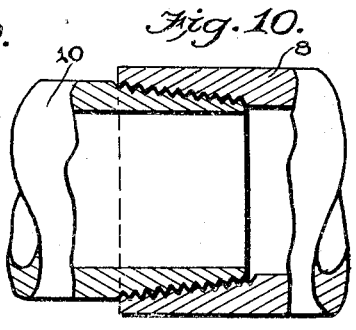
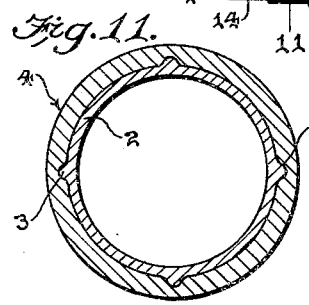
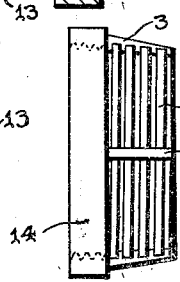
Inventor
Norman Leinau,
By George A. Prevost
Attorney Patented Nov. 17, 1931

1,832,713

UNITED STATES PATENT OFFICE

NORMAN LEINAU, OF YONKERS, NEW YORK, ASSIGNOR TO NORLEIN RESEARCH LABORATORIES, INC., OF HACKENSACK, NEW JERSEY, A CORPORATION OF NEW JERSEY

PIPE THREAD PACKING SLEEVE

Application filed June 11, 1930. Serial No. 460,449.

My invention consists in new and useful improvements in a pipe thread packing sleeve and has for its object to provide a packing which will fill the male or female threads of a pipe or pipe connection with a relatively thin layer of a malleable substance, whereby when two sections of pipe or their respective couplings are screwed into engagement, the packing sleeve will be deformed by the threads of the pipe or pipe coupling being screwed thereon, and pressed tightly into the threads of the adjacent pipe member, effecting a perfect seal at the joint.

Another object of the invention resides in the simplicity of structure and application and the low cost of manufacture.

A still further object of my invention is to provide a novel putting-on tool which co-operates with the structure of the packing sleeve in applying the same to the threads of a pipe, and after said sleeve is applied, cuts off the surplus metal and reinforcing ribs.

As will be seen from the following specification, the principle forming the basis of my invention may be employed for lining the threads of either the male or female portions of a pipe or coupling.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Figure 1 is a view in side elevation showing my improved thread packing sleeve of the female thread lining type.

Figure 2 is a side elevation of the corresponding putting-on tool.

Figure 3 is a sectional view showing the sleeve in place on the putting-on tool.

Figure 4 is a sectional view taken on line 4—4 of Fig. 3.

Figure 5 is a view similar to Fig. 3 showing the tool and sleeve in place within the end of a pipe.

Figure 6 shows the sleeve in place within the threads of a pipe after the tool has sheared the reinforcing ribs and been removed.

Figure 7 shows the sleeve after it has been deformed and pressed into the female threads of a pipe or coupling, by the male threads of an adjacent section.

Figure 8 is a view similar to Fig. 5 but of the male thread lining type.

Figure 9 is a similar view after the tool has sheared the reinforcing ribs.

Figure 10 is a view similar to Fig. 7 showing the deformation of the sleeve on the male threads of one member by the female threads of an adjacent member.

Figure 11 is a sectional view taken on line 11—11 of Fig. 8, and

Figure 12 is a side elevation showing a modification of the invention as applied to a male thread lining device.

In the drawings, referring particularly to Figs. 1 to 7 inclusive, 1 represents my improved packing sleeve of the female thread lining type, which consists of a substantially conical, relatively thin walled tubular member, provided on its periphery with a series of threads 2, its inner wall having a plurality of longitudinally extending reinforcing ribs 3 located at predetermined points as shown in Fig. 4.

This sleeve 1 is preferably formed by dye casting and while it may be composed of any suitable malleable substance, is preferably made of lead or copper.

4 represents the female thread lining putting-on tool, which consists of a substantially conical body portion 5 provided around its periphery with a series of longitudinally extending grooves 6, spaced apart to correspond with the ribs 3 on the sleeve. The tool is preferably provided with a knurled handle 7, to facilitate its turning when applying the sleeve as hereinafter set forth. It will be noted that this putting-on tool is preferably composed of a hard metal.

8 represents a pipe coupling provided with internal threads 9, into which the packing sleeve 1 is adapted to be screwed, and 10, Fig. 7, represents the adjacent pipe section, provided with external threads 11, which when screwed into the threads of the coupling 8, deform the thread lining 1.

In applying the female thread lining sleeve, the sleeve 1 is first placed on the conical body portion 5 of the putting-on tool 4, with the reinforcing ribs 3 engaging the longitudinal grooves 6 in the tool (Fig. 3). The tool and sleeve are then inserted in the pipe coupling 8, and turned by hand until the sleeve has been entirely inserted within the threaded portion 9 of said coupling, as shown in Fig. 5, leaving a few turns of the thread 9 exposed toward the outer extremity of the coupling. A continued turning of the tool 4 shears the ribs 3 from the sleeve and the tool is removed, leaving a relatively thin thread lining within the greater portion of the threads 9, as shown in Fig. 6.

The threaded end 11 of the adjacent pipe 10 is then screwed into the threaded end of the coupling 8, said threads initially engaging the exposed threads 9 at the outer extremity of said coupling. As the pipe 10 continues to turn within the coupling 8, the threads 11 engage the packing sleeve 1 and deform the same, pressing the body of the metal tightly into the threads 9, between the latter and the threads 11, as shown in Fig. 7, thus providing a perfect seal at the joint.

The construction and application of the male thread lining sleeve shown in Figs. 8 to 11 inclusive, is practically the same as that heretofore described, with the exception that the body of the sleeve is provided with internal threads 2 for engaging the external threads 11 on the pipe 10, and the reinforcing ribs 3 are provided on the outer circumference of the sleeve. The tool 4 of the male thread lining sleeve is necessarily somewhat different in shape, in that, instead of the core 5, the body of the tool is recessed as at 12, to fit over the body of the sleeve, and provided with longitudinal grooves 13 for engaging the ribs 3.

It will also be noted that with the male thread lining sleeve I may provide a reinforcing collar 14 at one end of the sleeve. In turning the coupling 8 on to the sleeve 1, as shown in Fig. 10, the surplus metal and the collar 14 are cut off by the coupling, leaving only a relatively thin packing layer of metal or other malleable substance between the adjacent threads of the pipe and pipe coupling.

In the modification shown in Fig. 12, the thread lining sleeve consists merely in a coil of malleable metal 15 shaped to correspond with and engage the threads 11 of the pipe 10. This coil 15 is provided with the usual ribs 3, by means of which the relative position of the coils is properly maintained and the entire device, supported and reinforced by the collar 14. With this structure there is no wall or web between the thread engaging portions, as with the structures heretofore described. However, the final effect is substantially the same.

From the foregoing it is believed that the construction, application and numerous advantages of my invention may be readily understood by those skilled in the art without further description, it being borne in mind that various changes may be made in the details of construction without departing from the spirit of the invention as set forth in the following claims.

What I claim and desire to secure by Letters Patent is:—

1. A pipe thread lining sleeve comprising a substantially cylindrical body portion of malleable material, provided with a series of threads on one of its peripheries, adapted to engage the threads of a pipe, its other periphery being plain and adapted to be engaged by the threads of an adjacent pipe member, whereby when the latter is screwed into the first named pipe member, the body of the sleeve is deformed between the adjacent pipe threads.

2. A pipe thread lining sleeve comprising a substantially cylindrical, relatively thin body portion of malleable material, having a series of threads extending around one of its peripheries, adapted to engage the threads of a pipe, its other periphery being plain and adapted to be engaged by the threads of an adjacent pipe member, whereby when the latter is screwed into the first named pipe member, the body of the sleeve is deformed between the adjacent pipe threads.

3. A pipe thread lining sleeve comprising a substantially cylindrical, relatively thin body portion of malleable material, having a series of threads extending around one of its peripheries, its other periphery being provided with at least one reinforcing rib, adapted to be sheared from said body when the sleeve is applied to the threads of a pipe.

4. A pipe thread lining sleeve comprising a substantially cylindrical, relatively thin body portion of malleable material, having a series of threads extending around one of its peripheries, its other periphery being provided with a plurality of longitudinally extending reinforcing ribs, adapted to be sheared from said body when the sleeve is applied to the threads of a pipe.

5. The combination with two sections of pipe provided with male and female threads respectively, a relatively thin thread lining sleeve of malleable material, provided with a series of threads around one of its peripheries for engaging the threads of one of said pipe members, its other periphery being plain, the other of said pipe members being adapted to engage the plain periphery of said sleeve, whereby when said pipe members are screwed together, the sleeve will be deformed between the adjacent threads to seal the joint.

6. The combination with two sections of pipe provided with male and female threads respectively, a relatively thin thread lining sleeve of malleable material, provided with a series of threads around one of its peripheries, for engaging the threads of one of said pipe members, means on the other periphery of said sleeve adapted to be engaged by a suitable putting-on tool for applying said sleeve, the other of said pipe members being adapted to engage said last named periphery of said sleeve, whereby when said pipe members are screwed together, the sleeve will be deformed between the adjacent threads to seal the joint.

7. A pipe thread lining sleeve comprising a coil of malleable material, the convolutions of which are shaped to correspond with and engage the threads of a pipe, means for reinforcing said coil, said means being adapted to be sheared from said coil when the latter is applied to the threads of a pipe.

8. A pipe thread lining sleeve as claimed in claim 7 wherein the means for reinforcing said coil comprises at least one rib engaging each of the convolutions of the coil.

In testimony whereof I affix my signature.

NORMAN LEINAU.